United States Patent
Andersson

(10) Patent No.: US 10,508,679 B2
(45) Date of Patent: Dec. 17, 2019

(54) WEDGE LOCKING WASHER WITH INCREASED CORROSION RESISTANCE AND METHOD FOR ITS MANUFACTURE

(71) Applicant: NORD-LOCK AB, Mattmar (SE)

(72) Inventor: Mattias Andersson, Östersund (SE)

(73) Assignee: Nord-Lock AB, Mattmar (SE)

( * ) Notice: Subject to any disclaimer, the term of this patent is extended or adjusted under 35 U.S.C. 154(b) by 109 days.

(21) Appl. No.: 15/549,122

(22) PCT Filed: Jan. 29, 2016

(86) PCT No.: PCT/SE2016/050065
§ 371 (c)(1),
(2) Date: Aug. 4, 2017

(87) PCT Pub. No.: WO2016/126188
PCT Pub. Date: Aug. 11, 2016

(65) Prior Publication Data
US 2018/0023614 A1    Jan. 25, 2018

(30) Foreign Application Priority Data
Feb. 4, 2015    (SE) ...................................... 1500068

(51) Int. Cl.
*F16B 39/24*    (2006.01)
*B21D 53/22*    (2006.01)
(Continued)

(52) U.S. Cl.
CPC ............. *F16B 39/24* (2013.01); *B21D 53/22* (2013.01); *F16B 33/008* (2013.01); *F16B 43/00* (2013.01)

(58) Field of Classification Search
CPC .......... F16B 39/24; B21D 53/22; B21D 53/20
(Continued)

(56) References Cited

U.S. PATENT DOCUMENTS 3,895,663 A * 7/1975 Bashline ................. F16B 39/24
                                                     411/136
5,190,423 A * 3/1993 Ewing ................... F16B 39/282
                                                     411/134
(Continued)

FOREIGN PATENT DOCUMENTS

CN       1427927 A      7/2003
CN       1598073 A      3/2005
(Continued)

OTHER PUBLICATIONS

Notification of the First Office Action received in Chinese Patent Application No. 201680007077.9 dated Nov. 2, 2018.
(Continued)

*Primary Examiner* — Flemming Saether
(74) *Attorney, Agent, or Firm* — Knobbe, Martens, Olson & Bear, LLP

(57) ABSTRACT

A wedge locking washer has a central axis, a central through hole defining an inner peripheral axial surface, an outer peripheral axial surface, a first side surface adapted to face and engage another wedge locking washer. The first side has a pattern of radially extending cams, each cam having a first surface inclined in relation to a central plane of a wedge can locking surface and a second surface. The first and the second surface of each cam meet in a radially extending cam edge and the second surface of a first cam meet the first surface of an adjacent cam in an radially extending inner corner. Each cam has a height h defined between a bottom plane in which the bottom of the inner corner is arranged and a top plane in which the top of the cam edge is arranged.

11 Claims, 7 Drawing Sheets

(51) Int. Cl.
*F16B 43/00* (2006.01)
*F16B 33/00* (2006.01)

(58) Field of Classification Search
USPC .............. 411/149, 161, 147; 470/41, 42
See application file for complete search history.

(56) References Cited

U.S. PATENT DOCUMENTS

| | | | | |
|---|---|---|---|---|
| 6,966,735 | B1* | 11/2005 | Yamazaki | F16B 39/24 411/131 |
| 8,092,129 | B2* | 1/2012 | Wiley | F16B 7/187 411/160 |
| 8,216,076 | B2* | 7/2012 | Andersson | C21D 9/00 470/42 |
| 8,807,896 | B2* | 8/2014 | McKinlay | F16B 39/24 411/147 |
| 9,909,608 | B2* | 3/2018 | Michiwaki | F16B 39/24 |
| 2013/0170922 | A1* | 7/2013 | Persson | B21D 53/22 411/161 |
| 2015/0204374 | A1* | 7/2015 | Stewart | F16B 39/12 411/161 |

FOREIGN PATENT DOCUMENTS

| | | |
|---|---|---|
| CN | 101460662 A | 6/2009 |
| CN | 102905814 A | 1/2013 |
| CN | 203939849 U | 11/2014 |
| WO | WO 2009/041906 A1 | 4/2009 |
| WO | WO 2013/081545 A1 | 6/2013 |

OTHER PUBLICATIONS

Search Report received in Chinese Patent Application No. 201680007077.9 dated Oct. 24, 2018.

* cited by examiner

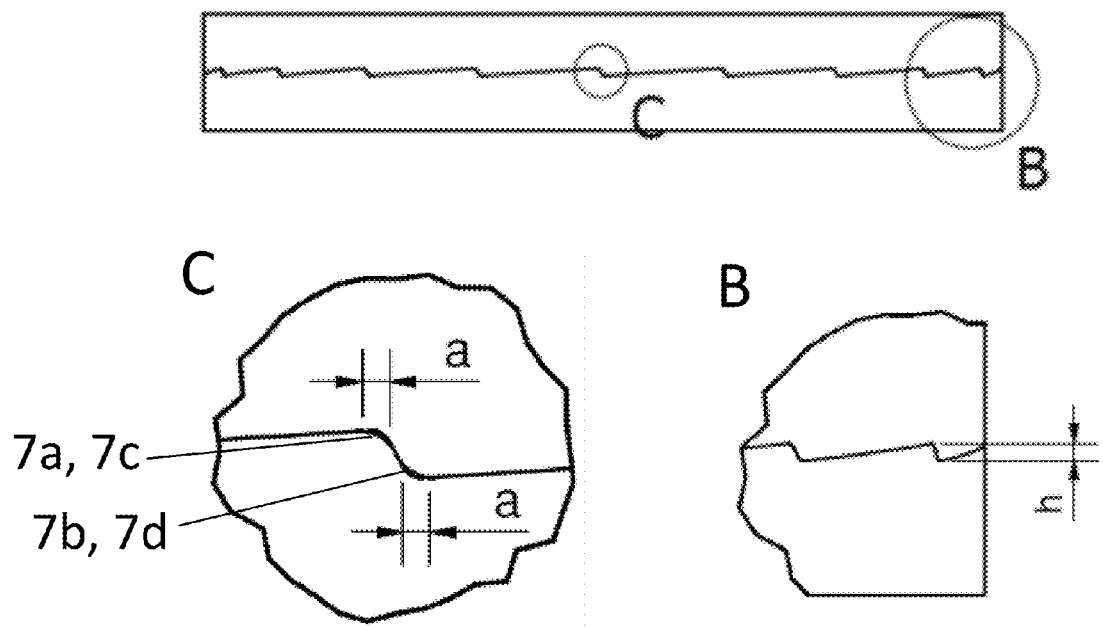
Fig. 4
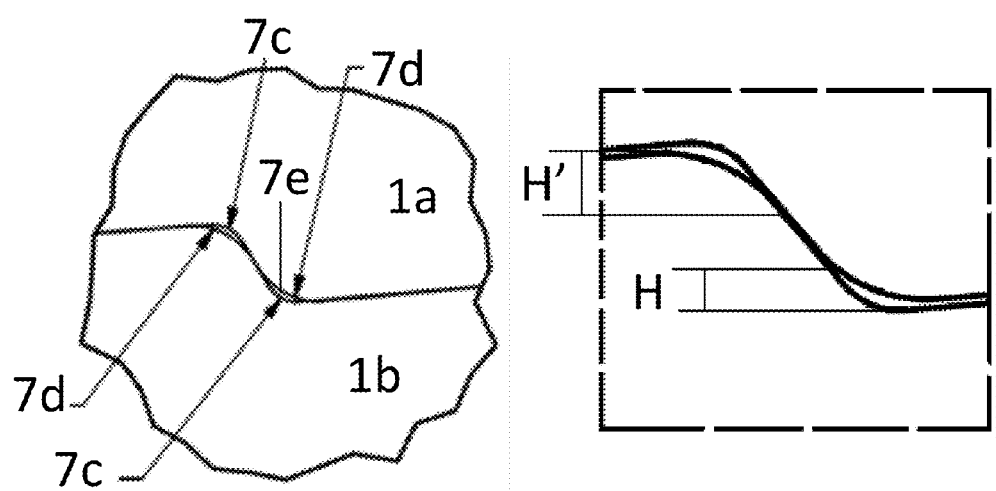
Fig. 4a
Fig. 4b

WEDGE LOCKING WASHER WITH INCREASED CORROSION RESISTANCE AND METHOD FOR ITS MANUFACTURE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure relates in general to a wedge locking washer. Furthermore, it relates to a method of producing a wedge locking washer comprising cold forming and surface hardening.

Description of the Related Art

A wedge locking washer is a thin disk-shaped plate with a central hole adapted for a screw shank that is able to prevent undesired untightening of a screw joint. A wedge locking washer is used to distribute the load of a threaded fastener. This application deals with wedge locking washers which are generally used in pairs. On one of the surface sides there is provided a pattern in the form of radially extending cams, also known as wedges. In a locking system, two wedge locking washers are arranged in a pair with the cam sides facing and engaging each other. The largest surface of the cams has an inclination, in relation to a horizontal plane, which is larger than the pitch of the threads of a screw in such a locking system. The inclination causes a positive and efficient locking of the fastening element by creating a wedge effect by the cams which in turn prevents a bolt or the like from rotating loose even when subjected to vibrations. This is thus an effect that is achieved when the two wedge locking washers rotates in relation to each other in such a way that the cams slide upon each other. When this sliding of the cams occurs the washer pair expands in axial direction, as the cams slide upon each other. If tightening of a joint instead is desired there is no corresponding expansion of the two washers as the sliding of the cams is prevented by the end of the wedge shape.

The surface opposite the cam surface of the wedge locking washer is often provided with another pattern adapted to increase the friction between the wedge locking washer and a screw head, a workpiece, a bolt or the like. Such a pattern may for example be in the form or radially extending teeth. Each tooth typically has a shorter peripheral extension than a peripheral extension of a cam on the opposite surface side of the wedge locking washer and is inclined in the opposite rotational direction to the inclination of the cams. The reason for this is that it should be possible for the teeth to interact and engage with a surface of for example a screw head, nut or an element that is attached, such that the washer is prevented from rotation with regard to this surface. Instead of a pattern other friction increasing surface treatments can be applied. Such treatments use of particles of hard metal applied to the surface.

Locking washers are produced from a strip blank of an appropriate material. The strip blank is subjected to forming and/or punching in order to produce the shape and surface pattern of the wedge locking washer. On example of a way of forming a wedge locking washer is disclosed in EP2195129. Wedge locking washers are required to have a high surface hardness in order to withstand the forces and in order not to deform the patterns of the teeth and cams such that they would lose their function in a locking system. Furthermore, a high surface hardness is desirable from a wear perspective. Therefore, it is appropriate to harden a material of a wedge locking washer in order to achieve the desired hardness. Depending on the material of the wedge locking washer, it may additionally or alternatively be appropriate to provide a hardened surface of the wedge locking washer or a hard coating to achieve the desired properties.

Wedge locking washers can for example be made of austenitic stainless steels such as AISI 304, AISI316 or AISI1316L. Austenitic stainless steels have a fairly high strength but cannot be through hardened. Austenitic stainless steels may therefore be susceptible to wear and should therefore be surface hardened in order to increase the surface hardness and reduce wear. Surface hardening of austenitic stainless steels can be achieved through various methods, such as to nitride the steel by plasma or by salt bath nitriding. Such methods may however reduce the corrosion resistance due to formation of chromium nitride in the surface layer. However, there are suitable options for surface hardening in which the corrosion resistance is maintained or even improved. Such surface hardening processes are in general based on subjecting the material to a gaseous thermochemical process. Such a process involves diffusion of carbon and/or nitrogen from a surrounding gas into the surface of the steel resulting in a surface layer enriched in carbon and/or nitrogen. In contrast to plasma nitriding or salt bath nitriding, such diffusion processes do not result in formation of chromium nitride but the nitrogen and carbon is provided interstitially into the microstructure. Hardening is performed after a part has been formed into its final shape, i.e. when no additional plastic deformation of the steel in order to achieve the desired final geometrical shape is intended.

As stated above, the diffusion of carbon and/or nitrogen into the surface may also increase the corrosion resistance of the austenitic stainless steel. This is however only possible in case there is no delta ferrite or deformation martensite (also known as deformation induced martensite) on the surface or in the surface region of the steel. Furthermore, the surface should be essentially free from surface defects in order to achieve the desired result. Otherwise, the risk for localised corrosion may occur.

Deformation martensite may arise when producing products using for example cold forming, deep drawing, stamping or pressing. Deformation martensite negatively influences the corrosion resistance of austenitic stainless steels not only during the surface hardening as disclosed above but also in general. It is possible to remove deformation martensite by solution annealing. However, such solution annealing also influence the bulk hardness and is therefore not suitable for all applications.

As disclosed above, wedge locking washers are formed by cold forming, such as punching or stamping, from a sheet blank of the steel. Austenitic stainless steels generally possess high plasticity and can easily be formed by cold forming. However, during cold forming deformation martensite may form as a result of the deformation introduced into the material. In view of the fact that the degree of deformation varies as a result of the patterns of the wedge locking washers, the deformation maritensite generally occurs more often in the most deformed portions of the wedge locking washer.

Delta ferrite may be present in the steel as a result of the manufacturing process. Delta ferrite also has a negative effect on corrosion resistance in general.

One way of improving the corrosion resistance of an austenitic stainless steel is by electro-polishing the surface of steel parts in order to dissolve contaminations and deformation martensite, as well as obtaining a smoother surface free from cavities in which it can be difficult to build up a passivating surface layer necessary to obtain the intended corrosion resistance. The electro-polishing also generally result in a higher content of chromium at the surface.

Electro-polishing is a process typically comprising immersing the metal part to be electro-polished in an electrolyte and allowing the metal part to act as an anode. Metal on the surface of the metal part to be electro-polished is oxidised and dissolved in the electrolyte as a current passes from the anode to the cathode. Electro-polishing of a surface hardened austenitic stainless steel thus removes a portion of the surface hardened layer of the austenitic stainless steel which is undesirable.

Electro-polishing of metal parts having complex geometries, such as sharp edges or deep holes, may however result in an uneven removal of metal from the surface of the part. This is due to different current densities at different parts of the surface resulting from the geometry of the metal part. Thus, electro-polishing of previously known wedge locking washers may cause different amount of metal removed from the edge of the cams and from the bottom of the cams.

SUMMARY OF THE INVENTION

The object of the present invention is to provide a wedge locking washer with increased corrosion resistance.

The object is achieved by means of a wedge locking washer and a method for producing a wedge locking washer of the present invention.

The aspect of the disclosure is thus described by a, wedge locking washer comprising a central axis, a central through hole concentric with central axis and defining an inner peripheral axial surface, an outer peripheral axial surface, a first side surface adapted to face and engage another wedge locking washer, said first side comprising a pattern of radially extending cams, each cam comprising a first surface inclined in relation to a central plane of the wedge can locking surface and a second surface and wherein the first and the second surface of each cam meet in a radially extending cam edge and wherein the second surface of a first cam meet the first surface of an adjacent cam in an radially extending inner corner, each cam having a height h defined between a bottom plane in which the bottom of the inner corner is arranged and a top plane in which the top of the cam edge is arranged, wherein the zone of smooth transition of the inner corner has a horizontal length a, the inner corner has an height H of at least h/4 and at most h/2 defined as the height H in vertical direction from the inner corner bottom to the end of the smooth transition zone, the cam edge having a smooth transition zone, which has a height H' that is equal to or larger than height H of the inner corner of the smooth transition zone, and wherein at least the first surface is surface hardened and electro-polished and/or pickled.

This is as described particularly advantageous in terms of corrosion resistance.

According to another aspect the wedge locking washer is made of austenitic stainless steel.

According to another aspect the second surface of the cams is arranged in a second plane which is angled in relation to a plane in which the central axis of the wedge locking washer is arranged.

According to another aspect the wedge locking washer further comprising a second side surface opposite the first side surface, the second surface comprising a pattern of radially extending teeth, each teeth comprising a radially extending teeth edge and a radially extending second inner corner defined between a second tooth surface of a tooth and a first surface of an adjacent tooth.

According to another aspect the wedge locking washer comprises preferably a rounding on inner corner is in an range from a radius t/3 which tangent to the two flanks to a radius 2t starting from the tooth edge to tangent the bottom.

According to another aspect the wedge locking washer comprises an inner corner of the cams that has an average radius between h/4 and h/3.

It has been found that by optimising the geometry of the cams of a wedge locking washer in addition to providing a surface hardening and a subsequent electro-polishing or pickling, the corrosion resistance of a wedge locking washer can be increased. This is achieved by minimising formation of deformation martensite and evening out the material removal rate over the surface of the wedge locking device during a subsequent processing step adapted to remove surface contaminations and defects.

The fact that the geometry of the cams of the wedge locking washer is altered by rounding off sharp edges and corners minimises the formation of deformation martensite resulting from a too high degree of deformation, especially in the bottom of the cams, and further smoothens out the material removal rate over the different parts of the surface during subsequent electro-polishing or pickling. Thereby, it is also possible to minimise the degree of electro-polishing or pickling needed in order to achieve a smooth surface free of surface defects and contaminations. This in turn minimises the loss of depth of the hardened surface layer of the wedge locking cam. Thereby, a wedge locking washer having an increased corrosion resistance as well as a deeper depth of the surface hardened layer compared to previously known wedge locking washers is obtained.

According to another aspect there is disclosed a method of producing a wedge locking washer comprising a. cold forming a wedge locking washer out of a steel blank in order to obtain a wedge locking washer comprising a central axis, a central through hole concentric with central axis and defining an inner peripheral axial surface, an outer peripheral axial surface, a first side surface adapted to face and engage another wedge locking washer, said first side comprising a pattern of radially extending cams, each cam comprising a first surface inclined in relation to a central plane of the wedge can locking surface and a second surface and wherein the first and the second surface of each cam meet in a radially extending cam edge and wherein the second surface of a first cam meet the first surface of an adjacent cam in an radially extending inner corner, each cam having a height h defined between a bottom plane in which the bottom of the inner corner is arranged and a top plane in which the top of the cam edge is arranged, the zone of smooth transition of the inner corner has a horizontal length a, the inner corner has an height H of at least h/4 and at most h/2 defined as the height H in vertical direction from the inner corner bottom to the end of the smooth transition zone, the cam edge having a smooth transition zone, which has a height H' that is equal to or larger than height H of the inner corner of the smooth transition zone;

b. surface hardening the cold formed wedge locking washer by diffusing carbon and/or nitrogen into the surface of the cold formed wedge locking washer, thereby obtaining a hardened surface layer of the wedge locking washer;

c. electro-polishing or pickling the surface hardened wedge locking washer to a surface depth lower than the depth of the hardened surface layer.

According to another aspect the method further comprises that the wedge locking washer is formed from an austenitic stainless steel blank sheet.

According to another aspect the method further comprises electro-polishing the cold formed wedge locking washer before surface hardening thereof.

According to another aspect the method further comprises the electro-polishing or pickling is performed to a depth of at most 15 μm, preferably between 4 μm and 10 μm.

BRIEF DESCRIPTION OF DRAWINGS

FIG. 4 illustrates a perspective view of a pair of wedge locking washers according to the present disclosure.

FIG. 4a discloses an enlargement of a pair of wedge locking washers according to the present disclosure.

In FIG. 4b is disclosed the height H of the smooth transition zone.

DETAILED DESCRIPTION OF THE INVENTION

In the following, the present invention will be described in more detail with reference to the accompanying drawings. The invention is however not limited to the embodiments discussed but may be varied within the scope of the present application.

Furthermore, the drawings shall not be considered drawn to scale, unless explicitly disclosed so, as some features may be exaggerated in order to more clearly illustrate the invention.

Figure 1:
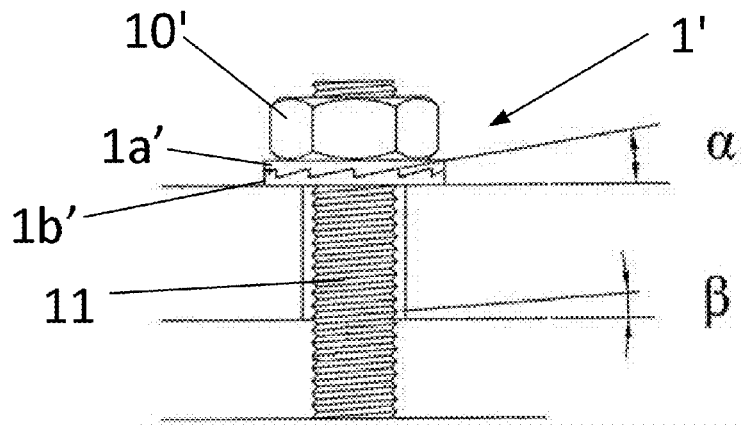
FIG. 1 illustrates a prior art locking system comprising a pair of wedge locking washers and illustrates the locking principle.

FIG. 1 illustrates a prior art locking assembly 1' wherein a first 1a' and a second 1b' locking washer are arranged in a pair for securing a fastening element such as a bolt 10' or the like. Each wedge locking washer 1a', 1b' has a central hole 2' wherein a shank 11' of fastening element extends. Furthermore, in FIG. 2 the wedge locking washer 1a', 1b' comprises a pattern of radially extending teeth 3' on a side intended to engage a contact surface of a fastening element, e.g. a bolt head bottom surface or a nut bottom surface, a workpiece surface or the like. The opposite side of the locking washer comprises a pattern of radially extending cams 4'. The cam sides of the wedge locking washers are intended to face and engage each other. The inclination of the cams as illustrated by angle α is larger than the pitch of the treads of the fastening element 10', illustrated by the angle β. Thereby, the inclination causes a positive and efficient locking of the fastening element by creating a wedge effect by the cams which in turn prevents a bolt or the like from rotating loose even when subjected to vibrations.

A wedge locking washer 1a', 1b' may be described as having a central axis 4' and having a central plane which is perpendicular to the central axis. The wedge locking washer comprises a central through hole 2' concentric with the central axis 4' and adapted to allow a shank of a fastening element 11' extend through the wedge locking washer 1a', 1b' when used in a locking system. In view of the central through hole, the wedge locking washer comprises an inner diameter 5' as well as an outer diameter 6'. A wedge locking washer 1a', 1b' often has a circular peripheral surface, i.e. the axial cross sectional area is circular cylindrical with a central through hole 2'. However, other shapes are possible such as an axial cross sectional area in the form of a hexagon or other polygonal shapes. The wedge locking washer 1a' is intended to be used together with a corresponding wedge locking washer 1b', in most cases identical to the first wedge locking washer 1a' but arranged up-side-down compared to the first wedge locking washer 1b'. Thus, the wedge locking washers 1a', 1b' are intended to be used in pairs. However, the wedge locking washers need not be of the same shape. They pair when put together can also in the form of a cone. Where the first washer has cams on the outer conical surface and the second has cams on the inner conical surface. Thus when in a joint the pair can together exert a spring force for further improving the locking abilities. It is also possible to have either in combination with flat wedge locking washers or the cone shaped variants to have a first washer having a larger through hole than the second locking washer. This can give the ability to approach the flat surface of a screw head having a camfer or radius at the transition between the shank and the flat surface of the underside of the screw head.

In order to provide the locking effect between two wedge locking washers 1a', 1b' of a pair, the wedge locking washers 1a', 1b' each comprise a purposively designed pattern on the surface facing the other wedge locking washer of the pair. The pattern comprises cams 7' extending radially on a surface of the wedge locking washer. In the case of so called flat wedge locking washers, the cams are arranged such that the bottom 8' of each of the cams is arranged in a common plane which is essentially parallel to the central plane of the wedge locking washer. In the same way, each top 9' of the cams are arranged in a common plane essentially parallel to the central plane of the wedge locking washer. In other words, the wedge locking washer is essentially a flat wedge locking washer except for the surface pattern(s).

The wedge locking washer may however also have a conical shape in which case the central plane of the wedge locking washer is not perpendicular to the central axis, but has a conical shape concentric with the central axis. In such a case, the con shape is preferred to be a truncated cone with a larger bottom circular opening, and a smaller top circular opening. The larger opening corresponds to the outer diameter of the washer and the smaller to the through hole of a flat washer. The openings being positioned in two parallel planes.

Figure 2:
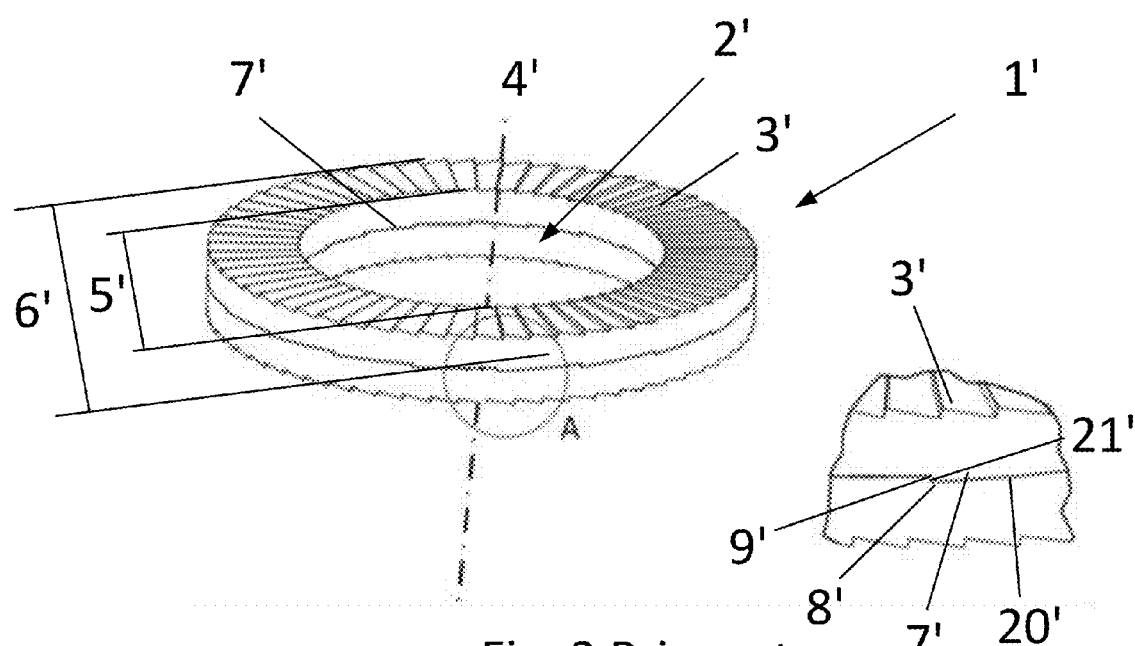
FIG. 2 illustrates a perspective view of a pair of wedge locking washers according to prior art.

FIG. 2 illustrates a pair of wedge locking washers 1a', 1b' in accordance with prior art, wherein an enlarged part view is shown on the right side. The sides of the wedge locking washers facing each other are provided with a pattern of radially extending cams 7' and the opposite sides of the wedge locking washers comprises a pattern of radially extending teeth 3'. Both the cams 7' and the teeth 3' extend from the inner diameter 5' to the outer diameter 6' of each of the wedge locking washers, and are evenly provided over the whole surfaces.

Figure 2A:
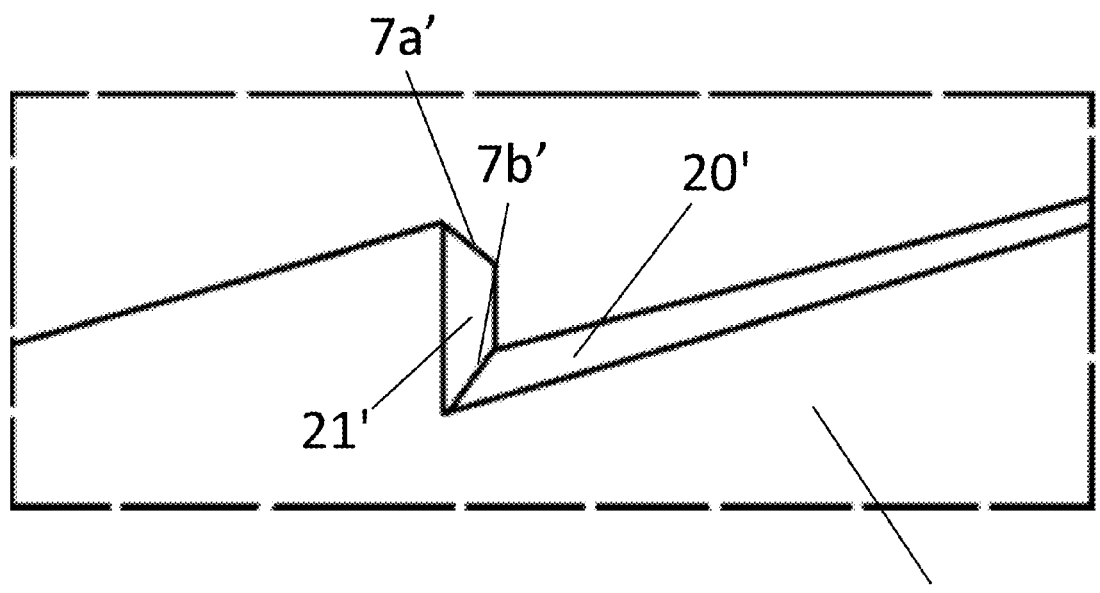
FIG. 2a illustrates an enlargement of one wedge locking washer according to the prior art showing the cam surface.

See FIG. 2 each cam 7' is formed by a first surface 20' provided at an inclination to the central plane of the wedge locking washer 1a', 1b' and a second surface 21' provided essentially in an axial plane in which the central axis 4' is arranged. The first and the second surface meet each other in a cam edge 7a' which extends radially. See also FIG. 2a which is an enlargement of a cam of a single wedge locking washer 1b'. Each cam thus have a cross sectional shape in the radial direction essentially in the form of a triangle, wherein the hypotenuse is formed by the first surface or the cam.

The cam edge 7a' of such a prior art wedge locking washer is essentially sharp. Furthermore, the second surface of the cam meets a first surface of an adjacent cam in an essentially sharp inner corner 7b'. The inner corner 7b' extends radially in the same manner as the cam edge 7a'.

When manufacturing such a wedge cam locking washer 1a', 1b', the deformation of the material during stamping or pressing varies across the surface due to the difference in geometry. When studying the microstructure of such a wedge locking washer, it was found that deformation martensite was formed at least in the inner corners of the locking washer.

Figure 3:
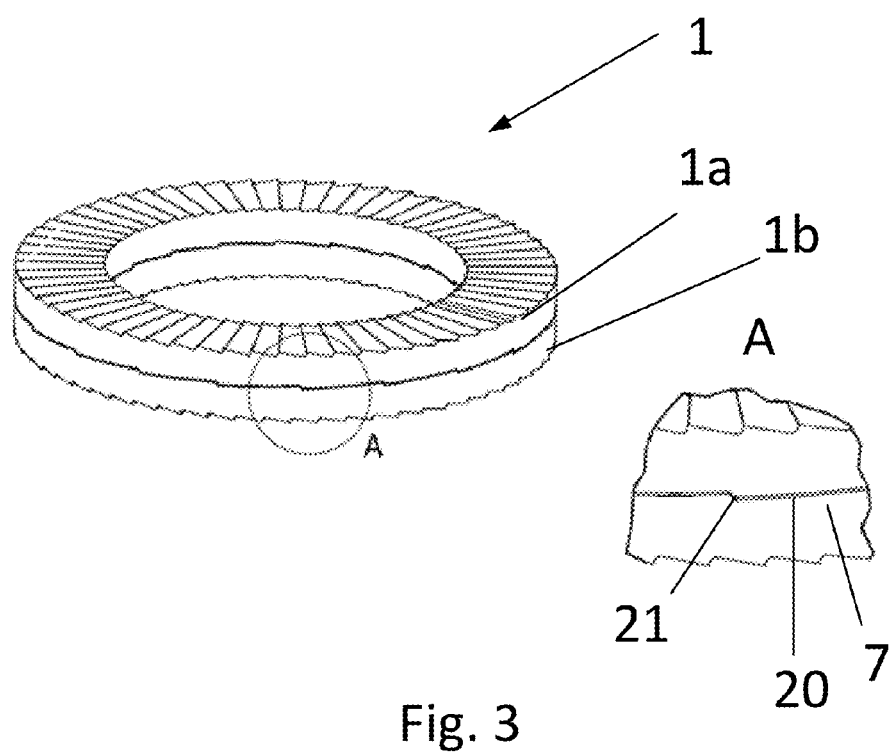
FIG. 3 illustrates a perspective view of a pair of wedge locking washers according to the present disclosure

In accordance with the present invention see FIG. 3 and FIG. 4, the geometry of the wedge locking washer 1a, 1b has been modified. This has in essence been achieved by eliminating the sharp edges of the inner corner 7b of the cam 7 where the second surface 21 of one cam meets the first surface 20 of an adjacent cam. This is achieved by arranging the inner corner 7b to have a smooth area in the transition region between the surfaces. In the present context, it can be referred to a radius. But this shall not be construed to be a single radius circle section. Radius shall thus not necessarily be considered to be constant over the whole transition between the second surface on one cam and a first surface of an adjacent cam but may also be in the form of sectional parts. This means that for example several small radiuses can form the smooth transition zone, or any other irregular shape that provides for a smooth transition zone in opposite to a sharp edge of the prior art. For that reason, the radius of the inner corner 7b should be considered to mean an average radius of the transition region between a second surface of a cam and a first surface of an adjacent cam.

FIG. 3 and FIG. 4 discloses a pair of wedge locking washers 1a, 1b according to the present disclosure. In view of the fact that the cam bottom 7b, i.e. the inner corner of the cams 7b defined by the transition between the second surface 21 of one cam 7 and the first surface 20 of an adjacent cam 7, is provided with smooth transition as defined above, in form of a radius, it is also necessary to provide the cam edge 7a with a non-sharp form such that the cam edge 7a may cooperate with a cam bottom 7b of an opposing wedge locking washer. As disclosed in FIG. 4a the washers 1a, 1b are identical, the cams have two roundings, 7c and 7d. The first rounding 7c is different from the second rounding 7d. This creates a small gap 7e. FIG. 4a discloses an enlargement for providing the difference between the first rounding 7c and the second rounding 7d. And it also discloses how the different roundings of wedge locking washer 1a, and 1b fit to each other.

In FIG. 4 view B is disclosed the height of an individual cam as h. In view C of FIG. 4 the horizontal length a of the smooth transition zone which is a for the inner corner 7b for both the upper wedge locking washer 1a, and the lower wedge locking washer 1b. For all embodiments the smallest dimension of a can be is h/3 for the inner corner 7b. The largest dimension of a is h for the inner corner 7b. It should be understood that if the shape is irregular it is the mean radius that is discussed with regard to the smooth transition zone.

Figure 5:
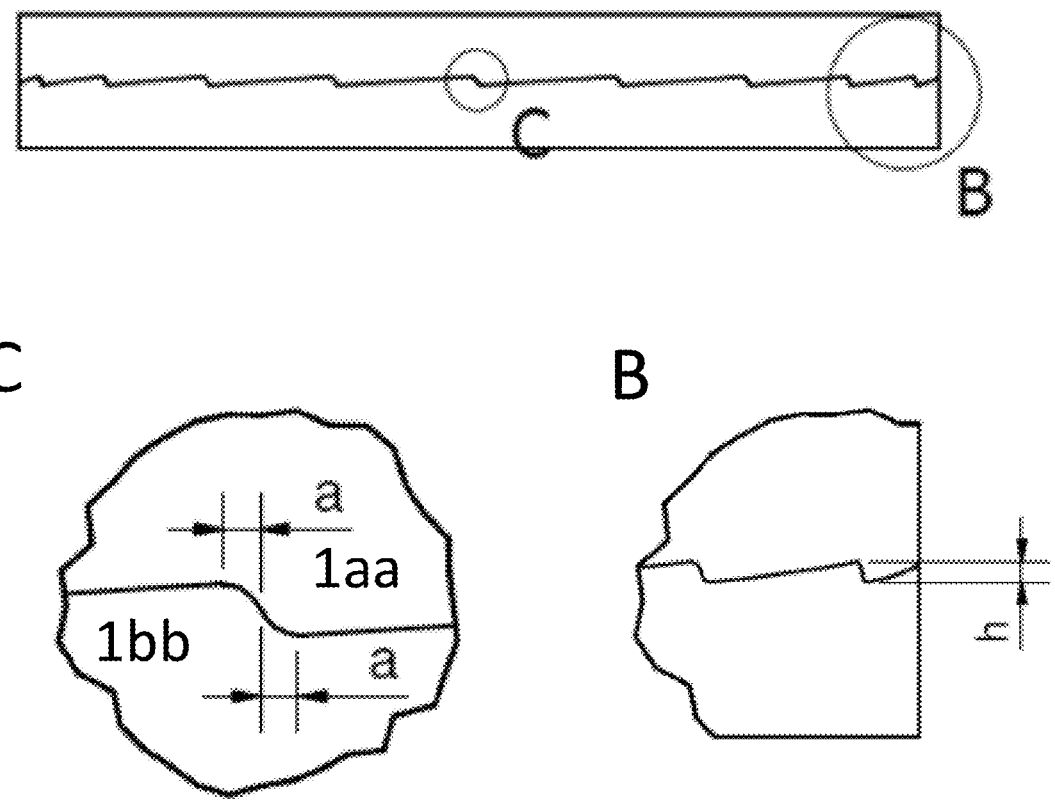
FIG. 5 illustrates a perspective view of a pair of wedge locking washers according to the present disclosure with alternative shape of inner corner.

In FIG. 4a it is disclosed how the two wedge locking washers 1a and 1b are positioned with the cams 7 against each other. There are the inner according to the present disclosure the zone of smooth transition has a horizontal length a, for the inner corner 7b In FIG. 4b is disclosed the height H of the smooth transition zone. the inner corner has an height H of at least h/4 and at most h/2 defined as the height H in vertical direction from the inner corner bottom to the end of the smooth transition zone, FIG. 5 illustrates an aspect of the disclosure where the upper smooth transition 7f and the lower transition 7g has the same shape. This leads to a more precise fitting between the upper wedge locking washer 1aa and the lower wedge locking washer 1bb. Still as said above the relation a to h is the same as previously discussed above. And for the aspect of disclosure of FIG. 5 there is no gap 7e present.

For all embodiments the edge 7a of the wedge locking washes it has a dimension that is equal to or smaller than the dimension of the inner corner 7b.

In an aspect of the disclosure, the smooth transition zone of the inner corner 7b of the cam 7 of the wedge locking washer 1a, 1b, is a radius. In an aspect of the disclosure the smooth transition zone of the edge 7a of the wedge locking washer 1a, 1b, cam 7 is a radius that is equal to or larger than the radius of the inner corner.

Figure 5A:
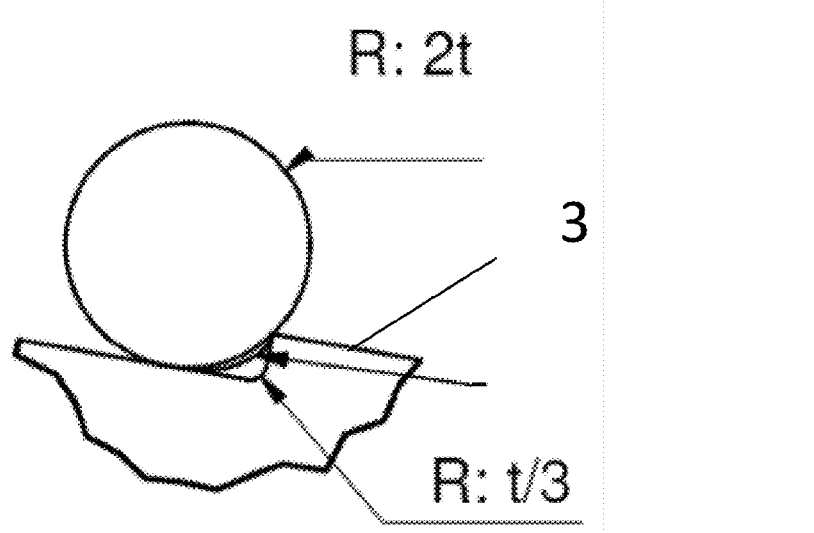
FIG. 5a illustrates a cut view of teeth according to the present disclosure.

FIG. 5a discloses for all embodiments of the cams how the other surface of the locking washer can be designed. In FIG. 5a there is disclosed a teeth 3. The teeth 3 has preferably a rounding on the inner corner is in an range from a radius t/3 which tangent to the two flanks to a radius 2t starting from the tooth edge to tangent the bottom.

This geometry together with a below discussed treatment gives unexpectedly excellent corrosion resistance.

Firstly, the wedge locking washer having the configuration as disclosed above is cold formed from a blank. The cold forming may for example comprise stamping or pressing. Such a step is performed in accordance with prior art with the only exception of modifying the tool to the intended geometry of the wedge locking washer.

The cold formed wedge locking washer is optionally subjected to an electro-polishing step in order to provide an improved surface more susceptible to surface hardening as disclosed below. This electro-polishing step is however optional.

Thereafter, the cold formed wedge locking washer is subjected to a surface hardening process wherein carbon and/or nitrogen is/are diffused into the surface of the wedge locking washer. This is performed by subjecting the wedge locking washer to a gaseous thermochemical process in order to effectuate the diffusion. Such processes are as such previously known and will therefore not be discussed in more detail.

Subsequently, the wedge locking washer is subjected to an electro-polishing step or a pickling step in order to remove surface defects and contaminants as well as deformation martensite on the surface. Such a step is performed to a depth sufficient to remove the surface defects and contaminants, but not so deep that the entire hardened surface layer of the wedge locking washer is removed. Preferably, this is performed to a depth of at most 15 µm.

The wedge locking washer may suitably be made of austenitic stainless steel. Examples of suitable austenitic stainless steels are AISI 316, AISI316L, AISI 317, AISI301-AISI305 and modifications thereof. Example compositions are given below in Table 1.

According to a preferred embodiment, the austenitic stainless steel is a steel having a PREN-value of less than 43. PREN is defined by the following formula:

PREN=1x% Cr+3.3x% Mo+16x% N wherein the percentages represent the percentages by mass.

Figure 8:
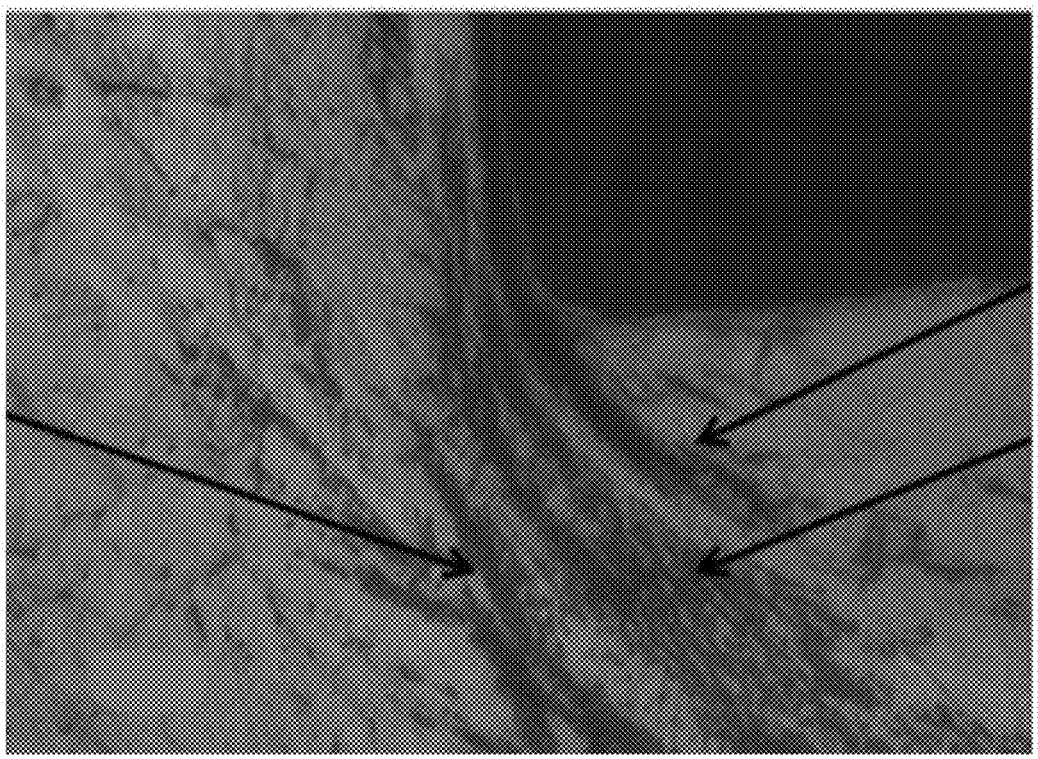
FIG. 8 illustrates a SEM image of a teeth bottom of a wedge locking washer according to prior art
Figure 9:
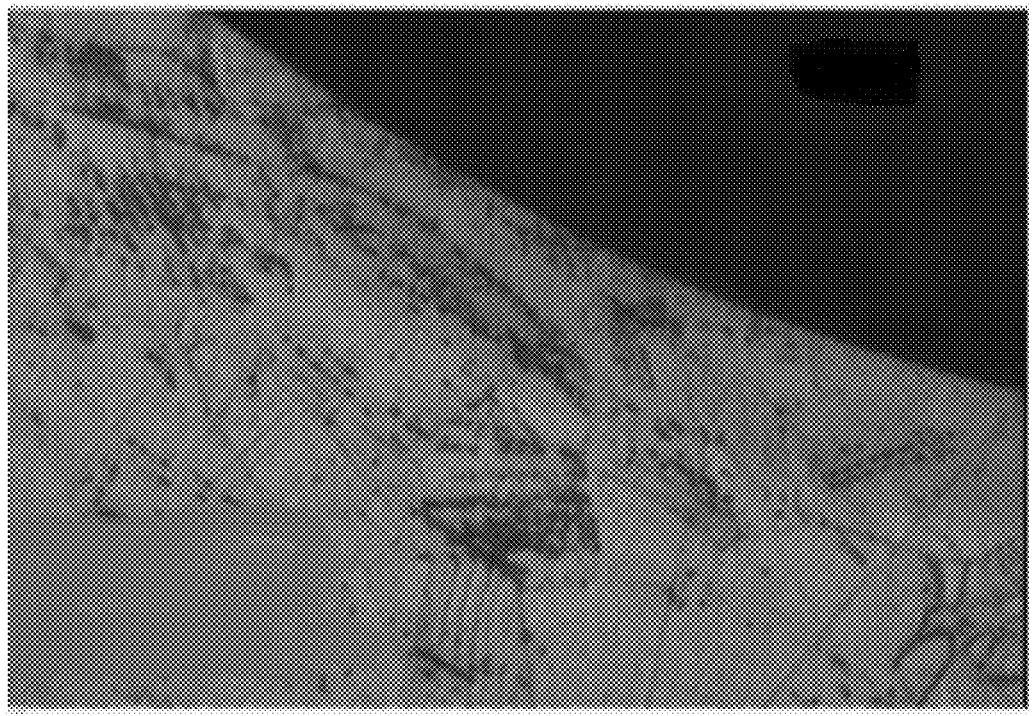
FIG. 9 illustrates a SEM image of a teeth bottom of a wedge locking washer according to the present invention

The microstructure shown in FIGS. 8 and 9 relates to the bottom of a cam. Thus, it can be concluded that the rounding of sharp edges in a wedge locking washer can considerably reduce the problems associated with deformation martensite.
Experimental Tests 2

The surface structure of a wedge locking washer of 316L which had been surface hardened as described below, but not subsequently electro-polished was investigated by SEM. The surface clearly showed the grains and the grain boundaries as shown in FIG. 6.

Furthermore, an identical wedge locking washer was subjected to electro-polishing and subsequently investigated by SEM. The surface was essentially smooth as shown in FIG. 7.

Figure 6:
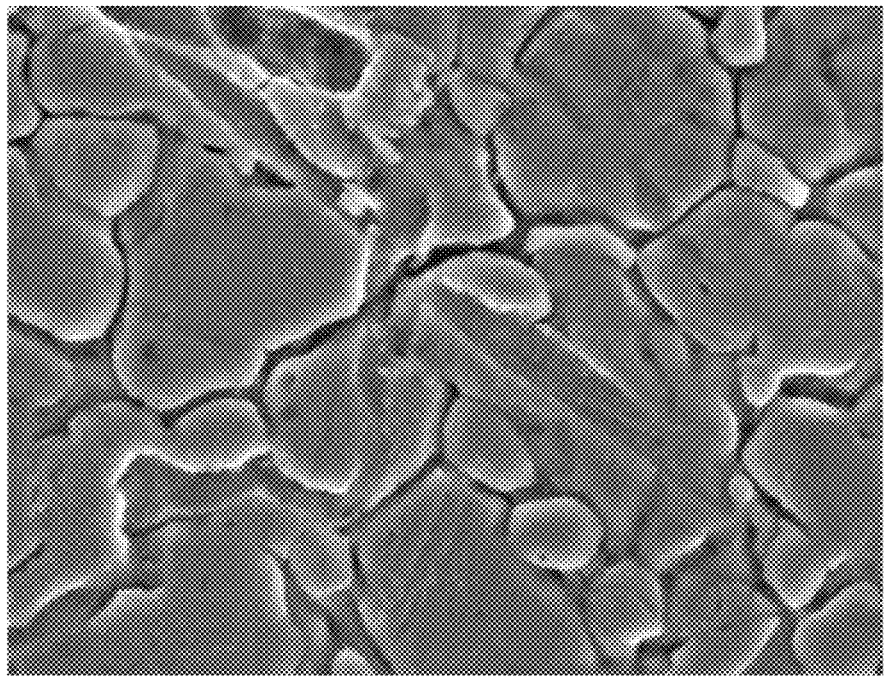
FIG. 6 illustrates a SEM image of a surface of a wedge locking washer after surface hardening
Figure 7:
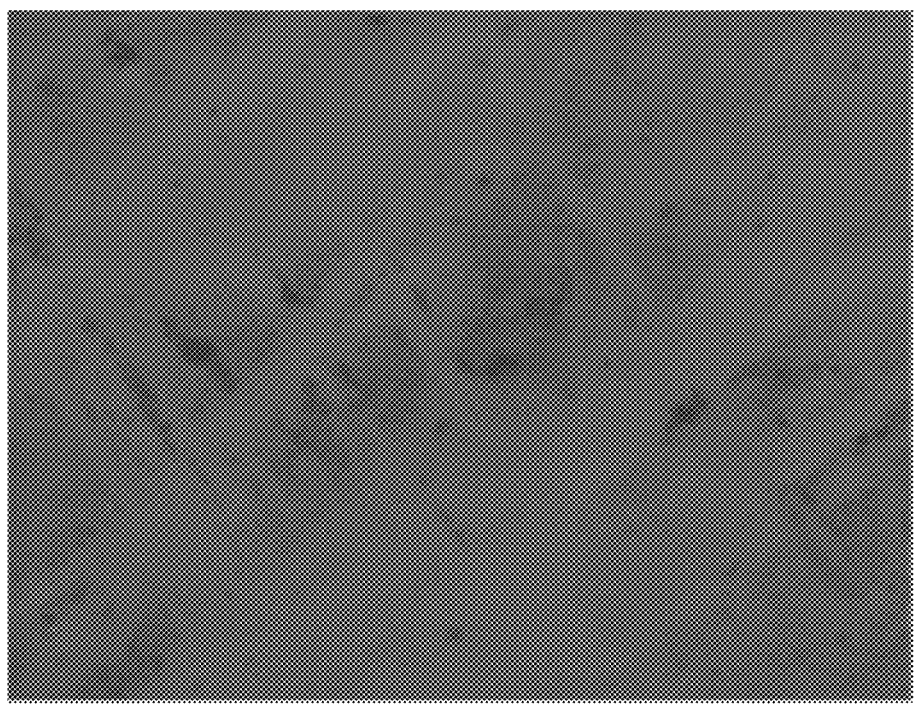
FIG. 7 illustrates a SEM image of a surface of a wedge locking washer after surface hardening and electro-polishing

The magnitude in the images of FIGS. 6 and 7 is the same and the distance mark in the lower right corner indicates a distance of 10 µm.

The results show that the surface of a wedge locking washer can be made very smooth, such that it does not contain any surface defects which may risk acting as initiation points of corrosion, by means of electro-polishing.
Experimental Tests 3

In order to test the corrosion resistance of wedge locking washers made of 316L being surface hardened as disclosed above, neutral salt spray testing was performed according to ISO9227.

Wedge locking washers with a previously known geometry having sharp cam edges and inner corners as well as sharp teeth, and wedge locking washers with the geometry

TABLE 1

| Designation | Chemical composition % by mass, max unless stated | | | | | | | | |
|---|---|---|---|---|---|---|---|---|---|
| AISI No | C | Si | Mn | P | S | Cr | Mo | Ni | Others |
| 301 | 0.15 | 1.00 | 2.00 | 0.045 | 0.030 | 16.0-18.0 | — | 6.0-8.0 | N 0.10 |
| 301L | 0.03 | 1.00 | 2.00 | 0.045 | 0.030 | 16.0-18.0 | — | 6.0-8.0 | N 0.20 |
| 301LN | 0.03 | 1.00 | 2.00 | 0.045 | 0.030 | 16.0-18.0 | — | 6.0-8.0 | N 0.07-0.20 |
| 302 | 0.15 | 0.75 | 2.00 | 0.045 | 0.030 | 17.0-19.0 | — | 8.0-10.0 | N 0.10 |
| 303 | 0.15 | 1.00 | 2.00 | 0.20 | 0.15 min | 17.0-19.0 | — | 8.0-10.0 | |
| 304 | 0.07 | 0.75 | 2.00 | 0.045 | 0.030 | 17.5-19.5 | — | 8.0-10.5 | N 0.10 |
| 304 | 0.08 | 1.00 | 2.00 | 0.045 | 0.030 | 18.0-20.0 | | 8.0-11.0 | |
| 304L | 0.030 | 0.75 | 2.00 | 0.045 | 0.030 | 17.5-19.5 | — | 8.0-12.0 | N 0.10 |
| 304L | 0.030 | 1.00 | 2.00 | 0.045 | 0.030 | 18.0-20.0 | | 8.0-12.0 | |
| 304LN | 0.030 | 0.75 | 2.00 | 0.045 | 0.030 | 18.0-20.0 | — | 8.0-12.0 | N 0.10-0.16 |
| 305 | 0.12 | 0.75 | 2.00 | 0.045 | 0.030 | 17.0-19.0 | — | 10.5-13.0 | — |
| 316 | 0.08 | 0.75 | 2.00 | 0.045 | 0.030 | 16.0-18.0 | 2.0-3.0 | 10.0-14.0 | N 0.10 |
| 316L | 0.030 | 0.75 | 2.00 | 0.045 | 0.030 | 16.0-18.0 | 2.0-3.0 | 10.0-14.0 | N 0.10 |
| 316Ti | 0.08 | 0.75 | 2.00 | 0.045 | 0.030 | 16.0-18.0 | 2.0-3.0 | 10.0-14.0 | Ti 5x (C + N)/0.70 N 0.10 |
| 316LN | 0.030 | 0.75 | 2.00 | 0.045 | 0.030 | 16.0-18.0 | 2.0-3.0 | 10.0-14.0 | N 0.10-0.16 |
| 317 | 0.08 | 0.75 | 2.00 | 0.045 | 0.030 | 18.0-20.0 | 3.0-4.0 | 11.0-15.0 | N 0.10 |
| 317L | 0.030 | 0.75 | 2.00 | 0.045 | 0.030 | 18.0-20.0 | 3.0-4.0 | 11.0-15.0 | N 0.10 |

Experimental Tests 1

The microstructure of a prior art wedge locking washer made of AISI316L was investigated and it was found that deformation martensite had been formed at the bottom of a teeth. This is illustrated in FIG. 8 showing a Scanning Electron Microscopy (SEM) image. From the image it can be seen tensile lines. It can also be seen a severely deformed material with a lot or deformation martensite. The arrows point to tensile lines present in striped pattern.

Furthermore, the microstructure of a wedge locking washer of AISI 316L having a geometry in accordance with the present disclosure was investigated. The result is shown in FIG. 9 and it can be seen that the locking washer is essentially free from deformation martensite.

according to the present invention were tested, both with and without electro-polishing after the surface hardening. The tested wedge locking washers had the same dimensions and only differed in the shape of edges and inner corners.

Figure 10:
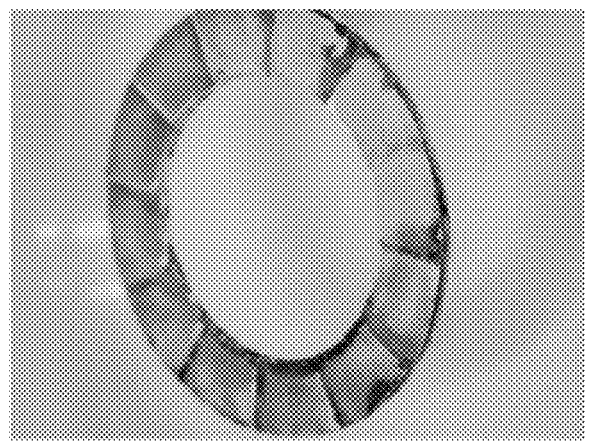
FIG. 10 illustrates a photograph of a cam side surface of a wedge locking washer according to prior art which has been surface hardened but not electro-polished after 130 h neutral salt spray testing
Figure 11:
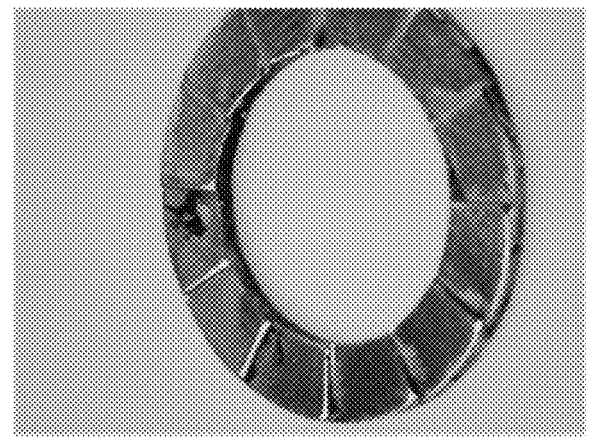
FIG. 11 illustrates a photograph of a cam side surface of a wedge locking washer according to prior art which has been surface hardened and electro-polished after 1000 h neutral salt spray testing

The result of a wedge locking washer with previously known geometry showed that electro-polishing increased the corrosion resistance compared to a wedge locking washer with the same geometry and not subjected to electro-polishing. However, corrosion was detected in bottoms of teeth and bottoms of cams. This is illustrated in FIG. 10 showing a photograph of the cam side of a previously known wedge locking washer not subjected to electro-polishing and after having been subjected to the neutral salt spray testing for 130 hours, and FIG. 11 showing a photograph of the cam side of a previously known wedge locking washer having been subjected to electro-polishing and after having been subjected to the neutral salt spray testing for 1000 hours.

Figure 12:
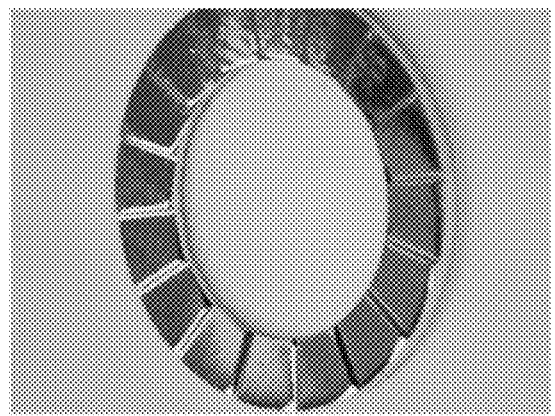
FIG. 12 illustrates a photograph of a cam side surface of a wedge locking washer according to the present invention after 1000 h neutral salt spray testing

The wedge locking washer with a geometry according to the present invention and subjected to electro-polishing showed considerably less corrosion both in bottoms of cams and in bottoms of teeth compared to the locking washers having the prior art geometry. This is illustrated in FIG. 12 showing a photograph of a cam side of said wedge locking washer after 1000 hours of neutral salt spray testing.

What is claimed is:

1. A wedge locking washer comprising a central axis, a central through hole concentric with the central axis and defining an inner peripheral axial surface, an outer peripheral axial surface, a first side surface adapted to face and engage another wedge locking washer, said first side comprising a pattern of radially extending cams, each cam comprising a first surface inclined in relation to a central plane of a wedge cam locking surface and a second surface and wherein the first and the second surface of each cam meet in a radially extending cam edge and wherein the second surface of a first cam meet the first surface of an adjacent cam in an radially extending inner corner, each cam having a height h defined between a bottom plane in which the bottom of the inner corner is arranged and a top plane in which the top of the cam edge is arranged, wherein a zone of smooth transition of the inner corner has a horizontal length a, the inner corner has a height H of at least h/4 and at most h/2 defined as the height H in a vertical direction from the inner corner bottom to the end of the smooth transition zone, the cam edge having a smooth transition zone, which has a height H' that is equal to or larger than the height H of the inner corner of the smooth transition zone, and wherein at least the first surface is a surface hardened and electro-polished and/or pickled.

2. The wedge locking washer according to claim 1, wherein the wedge locking washer is made of an austenitic stainless steel.

3. The wedge locking washer according to claim 1, wherein the second surface of the cams is arranged in a second plane which is angled in relation to a plane in which the central axis of the wedge locking washer is arranged.

4. The wedge locking washer according to claim 1, further comprising a second side surface opposite the first side surface, the second side surface comprising a pattern of radially extending teeth, each teeth comprising a radially extending teeth edge and a radially extending second inner corner defined between a second tooth surface of a tooth and a first surface of an adjacent tooth.

5. The wedge locking washer according to claim 4, wherein a rounding on the inner corner is in a range from a radius t/3 which tangent to the two flanks to a radius 2t starting from the tooth edge to tangent the bottom, wherein t is a tooth height.

6. The wedge locking washer according to claim 1, wherein the inner corner of the cams has an average radius between h/4 and h/3.

7. A method of producing a wedge locking washer comprising:
   a. cold forming a wedge locking washer out of a steel blank in order to obtain a wedge locking washer comprising a central axis, a central through hole concentric with the central axis and defining an inner peripheral axial surface, an outer peripheral axial surface, a first side surface adapted to face and engage another wedge locking washer, said first side comprising a pattern of radially extending cams, each cam comprising a first surface inclined in relation to a central plane of a wedge cam locking surface and a second surface and wherein the first and the second surface of each cam meet in a radially extending cam edge and wherein the second surface of a first cam meet the first surface of an adjacent cam in an radially extending inner corner, each cam having a height h defined between a bottom plane in which the bottom of the inner corner is arranged and a top plane in which the top of the cam edge is arranged, a zone of a smooth transition of the inner corner has a horizontal length a, the inner corner has a height H of at least h/4 and at most h/2 defined as the height H in a vertical direction from the inner corner bottom to the end of the smooth transition zone, the cam edge having a smooth transition zone, which has a height H' that is equal to or larger than the height H of the inner corner of the smooth transition zone;
   b. surface hardening the cold formed wedge locking washer by diffusing carbon and/or nitrogen into the surface of the cold formed wedge locking washer, thereby obtaining a hardened surface layer of the wedge locking washer;
   c. electro-polishing or pickling the surface hardened wedge locking washer to a surface depth lower than a depth of the hardened surface layer.

8. The method according to claim 7, wherein the wedge locking washer is formed from an austenitic stainless steel blank sheet.

9. The method according to claim 7, further comprising electro-polishing the cold formed wedge locking washer before surface hardening thereof.

10. The method according to claim 7, wherein the electro-polishing or pickling is performed to a depth of at most 15 µm.

11. The method according to claim 7, wherein the electro-polishing or pickling is performed to a depth which is between 4 µm and 10 µm.

* * * * *